US012580900B2

(12) United States Patent

Gaddamu et al.

(10) Patent No.: US 12,580,900 B2
(45) Date of Patent: Mar. 17, 2026

(54) NESTED ENCRYPTION PROTOCOL INDICATORS FOR WEB TOKENS

(71) Applicant: Capital One Services, LLC, McLean, VA (US)

(72) Inventors: Anand Gaddamu, Glen Allen, VA (US); Mehulkumar Jayantilal Garnara, Glen Allen, VA (US); Nitin Goel, Glen Allen, VA (US); Anjal Shah, Glen Allen, VA (US); Sweta Tiwary, Basking Ridge, NJ (US); George Fletcher, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/809,198

(22) Filed: Aug. 19, 2024

(65) Prior Publication Data

US 2026/0052128 A1 Feb. 19, 2026

(51) Int. Cl.
| | |
|---|---|
| *H04L 9/40* | (2022.01) |
| *H04L 9/14* | (2006.01) |
| *H04L 9/30* | (2006.01) |
| *H04L 9/32* | (2006.01) |

(52) U.S. Cl.
CPC ............ *H04L 63/0428* (2013.01); *H04L 9/14* (2013.01); *H04L 9/3073* (2013.01); *H04L 9/3213* (2013.01)

(58) Field of Classification Search
CPC ... H04L 63/0428; H04L 63/3213; H04L 9/14; H04L 9/3073
See application file for complete search history.

(56) References Cited

U.S. PATENT DOCUMENTS

| | | | | |
|---|---|---|---|---|
| 11,632,362 B1 * | 4/2023 | Woodward | ............ | H04L 9/3234 |
| | | | | 713/171 |
| 2019/0173877 A1 * | 6/2019 | Yamanakajima | ... | H04L 63/0807 |
| 2021/0126910 A1 * | 4/2021 | Chauhan | ............. | H04L 63/0428 |
| 2021/0328979 A1 * | 10/2021 | M | ......................... | H04L 9/3263 |
| 2022/0158846 A1 * | 5/2022 | Ray | ..................... | H04L 63/0807 |
| 2025/0211987 A1 * | 6/2025 | Jumper, Jr. | ......... | H04W 12/041 |
| 2025/0274447 A1 * | 8/2025 | Ahuja | ................. | H04L 63/0876 |

* cited by examiner

*Primary Examiner* — Vance M Little

(74) *Attorney, Agent, or Firm* — Foley & Lardner LLP

(57) ABSTRACT

A method and related system for generating and securely sending multi-recipient web tokens includes obtaining a first key associated with a first key identifier and a second key associated with a second key identifier. The method includes generating a (1) first web token portion that includes the first identifier, the first key identifier, and first encrypted information encrypted with the first key and (2) a second web token portion that includes the second identifier, the second key identifier, and second encrypted information encrypted with the second key. The method includes issuing the web token to at least one of recipient identified in the web token.

20 Claims, 6 Drawing Sheets

600

604

Update Key Data Store Based on Obtained Initial Recipient Identifier and Initial Key Identifier Associated With Initial Recipient Identifier

616

Update Key Data Store Based On Comparison between Current Time and Set of Expiration Times

620

Provide Key-Related Data Based on Obtained Request

630

Construct Web Token With Retrieved Key-Related Data

NESTED ENCRYPTION PROTOCOL INDICATORS FOR WEB TOKENS

SUMMARY

Web tokens play an important role in modern web applications and application program interfaces (APIs). Web tokens provide a way to authenticate or authorize program instructions sent over a network. For example, a web token can provide information used for stateless authentication operations that reduces the amount of information needed to store in server-side systems.

Despite the benefits and the wide-ranging uses of web tokens, the use of single-encryption web tokens has limitations that reduce their effectiveness. In many web application operations, related processes must work concurrently or in series to effectuate a particular web application operation. For example, when a database transaction is executed, a server-side application may generate a first web token for authentication and a second web token to for transmitting transaction-related data. Scaling such operations can create buffering, processing, and data storage concerns.

A system may reduce or mitigate such issues by use multi-recipient web tokens that can be concurrently sent to multiple recipients. However, sending data to non-designated recipients can create security risks. However, a system can enhance communication security across computer networks or individual nodes of a computer network by using web tokens that have nested encryption protocol indicators. Some embodiments may receive a request to generate a web token for multiple recipients, where the use of web tokens for multiple recipients can improve storage efficiency and reduce the complexity of token management. Some embodiments may then retrieve recipient identifiers for these multiple recipients and obtain keys and their associated public-key identifiers based on these recipient identifiers. Some embodiments may then generate a web token such as a JavaScript object notation (JSON) web token, where the web token includes token claims associated with the different recipients. For example, the generated web token may include a first key-value pair in a token payload, where the key in this first key-value pair includes the recipient identifier and the value of this first heat-value pair includes both a key identifier and encrypted information. The use of a recipient identifier as a key in the token payload increases the retrieval efficiency of data in the token payload using a value that would be known to the intended recipient. Furthermore, the key identified by the key identifier may be used to encrypt information to form encrypted information, permitting a targeted recipient that provided the key identifier to decrypt the encrypted information with a decryption key associated with the key identifier. Some embodiments may include similar key-value pairs for other recipients, such that a second key-value pair may include a second recipient identifier, second key identifier, and second encrypted information.

After generating the web token, some embodiments may issue this web token from an originating network location to the first recipient and the second recipient. The first recipient would have access to a decryption key for the first encrypted data (e.g., a private key of the first public-private key pair) and be able to decrypt the first encrypted data in the first key-value pair. However, without the private key of the second key-value pair, the first recipient would be unable to decrypt the second encrypted data in the second key-value pair. Similarly, the second recipient would have access to a decryption key corresponding with the second encrypted data in the second key-value pair and thus be able to decrypt this second encrypted data. However, without access to the first decryption key, this second recipient would be unable to decrypt the encrypted data in the first key-value pair. By using a multi-recipient web token with nested encryption protocol indicators, a system may reduce processing overhead costs needed for tracking multiple web tokens while still permitting multiple recipients to securely receive and process data.

Some embodiments may perform recipient-specific or key-specific key rotation operations. For example, some embodiments may have initially updated a database to indicate that a first recipient identifier or a public key identifier is associated with a stored public key. Some embodiments may then determine whether a current time has reached an expiration time and, in response to determining that the expiration time is satisfied, some embodiments may then update the database to associate the first recipient identifier with a new public key identifier and a corresponding new public key. When generating a multi-recipient web token, a first nested security protocol can include this new public key identifier in lieu of the original public key identifier.

Various other aspects, features, and advantages of the invention will be apparent through the detailed description of the invention and the drawings attached hereto. It is also to be understood that both the foregoing general description and the following detailed description are examples and are not restrictive of the scope of the invention.

Figure 1:
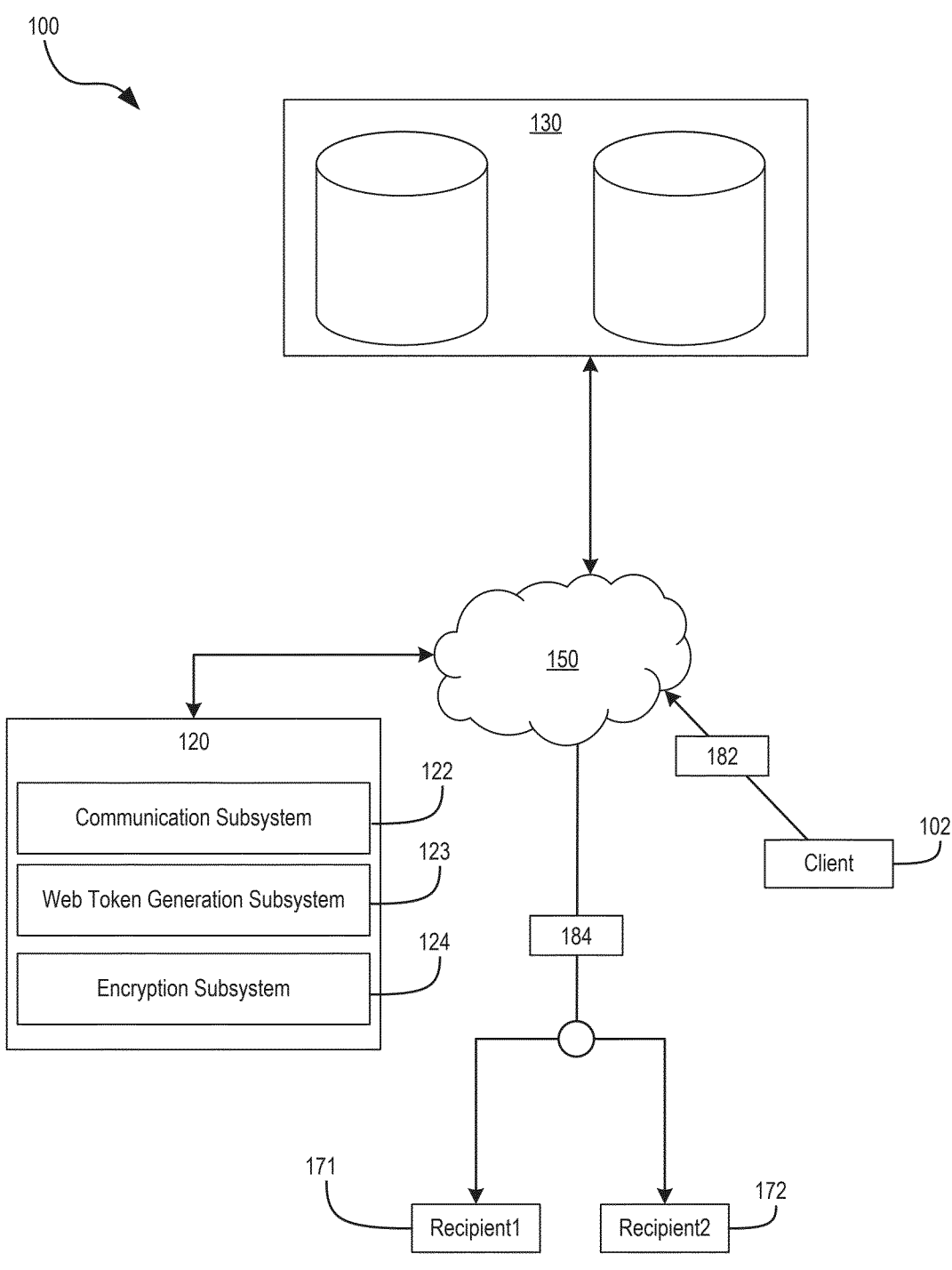
FIG. 1 shows an illustrative diagram for providing a secure, multi-recipient web token, in accordance with one or more embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram for providing a secure, multi-recipient web token, in accordance with one or more embodiments. A system 100 includes a client device 102 in communication with a server 120 via a network 150. As will be described further in this disclosure, the server 120 may perform operations to generate a web token having nested encryption protocol indicators assigned to different recipients. By using these nested encryption protocol indicators, the generated web token may be distributed amongst multiple recipients without fearing that the recipients will have access to data that they should not be able to access. Furthermore, as described elsewhere in this disclosure, the server 120 may perform key rotation operations that a subset of the keys based on time or other he expiration criteria without unnecessarily switching the keys for other recipients. By performing partial key rotation, some embodiments may perform operations that reduce the risk of a web token being stale or otherwise being unusable as a result of key expiration. Furthermore, some embodiments may avoid creating a stale unusable web token by providing multiple encryption key identifiers in a web token for the same encrypted data. As described elsewhere, such operations can further increase the viability of a multi-session web token that can be used by multiple recipients. Furthermore, the use of a multi-recipient, multi-session web token can avoid issues related to key rotation that occur in the use of multiple web tokens for a single session, such as issues arising from using a token that becomes stale as a result of expiring in the middle of a lengthy session.

As shown in the system 100, the client device 102 may include one of various types of computing devices, such as a laptop, a tablet, a desktop, etc. The client device 102 may send requests, responses, or other messages to the server 120 that may require communication with a first recipient 171 and a second recipient 172. Applications, services, or other operations may use data provided by the client device 102, the first recipient 171, the second recipient 172, the server 120, or a set of databases 130. The set of databases 130 may include various types of databases, such as SQL databases, no SQL databases, graph databases, etc. The server 120 may perform operations related to subsystems 122-125.

Some embodiments may enhance communication security using a web token after first obtaining recipient identifiers indicating target recipients that will receive the web token. Some embodiments may then obtain a set of public keys and their associated key identifiers based on these recipient identifiers. For example, some embodiments may receive a first request from a client device that requires authenticating the request and then executing a task based on the data in that first request. To perform the authentication and execution task, some embodiments may obtain the recipient identifier of a first recipient that is to perform the authentication task and the recipient identifier of a second recipient that is to perform the execution task. Some embodiments may then generate a web token having nested encryption protocol identifiers based on these recipient identifiers and issue the web token to each of the target recipients. For example, a web token may include the multiple nested web token claims, where the claim information inside of each respective nested web token claim holds data assigned to a different recipient.

Some embodiments may generate a web token using keys associated with different recipients. For example, some embodiments may receive instructions to send a web token to a first recipient that is identified by a first recipient identifier and a second recipient that is identified by a second recipient identifier. Some embodiments may then retrieve a first public key associated with a first recipient identifier, obtain claim information assigned to the recipient identified by the first recipient identifier, and encrypt this claim information using this first public key. Some embodiments may then either update an existing web token or generate a new web token to include the first recipient identifier, first public key identifier, and encrypted information in a key-value pair or another web token portion that is nested within a larger web token portion. Some embodiments may perform similar operations for a second recipient identifier and generate a second nested key-value pair or other web token portion. This second nested key-value pair may include the second recipient identifier and a second public key identifier associated with the second recipient identifier. The second nested key-value pair may also include second encrypted information that is encrypted from claim information assigned to the second recipient, where the encryption operation used to produce this second encrypted information includes using the second public key identified by the second key identifier as an encryption key. Some embodiments may use the recipient identifiers as keys of the key-value pair to increase retrieval efficiency to O(1) when the recipient identifier is known to a receiver of the web token.

As used in this disclosure, a key may include any type of data used to encrypt or decrypt information. For example, a key may include a public key or a private key of a public-private key pair. Alternatively, a key may include keys for other types of cryptographic schemes, such as a symmetric key (e.g., pre-shared keys, one-time pads, etc.). Furthermore, unless said otherwise, a key for a key-value pair that is described as being an identifier may instead be represented by a proxy for that identifier. While some embodiments may use a recipient identifier as the key of a key-value pair, some embodiments may use a proxy name for that recipient identifier, where a client device may determine that it has the appropriate decryption key corresponding with that proxy name or an identifier associated with that proxy name.

The system may be used to encrypt data assigned to different recipients based on keys associated with those different recipients. As used in this disclosure, a web token may include any type of data that is to be transmitted a client device or a server device to one or more recipients. Furthermore, information to be assigned to a recipient may include various types of information, such as text data, image data, biometric data, sensor-collected data, etc. Data assigned to a first recipient may include biometric data or data derived from biometric data, process biometric data may include a fingerprint, a handprint, a retina image, a voice recording, or a digital signature generated from the previously listed biometric data.

As described elsewhere, a server system (e.g., a on-premises set of servers, a cloud-based server system, etc.) may receive commands or messages that causes the server system to generate a web token for multiple recipients. The server system may generate the web token with multiple web token portions, for each web token portion includes a nested encryption protocol indicator for a specified recipient and encrypted data assigned to that recipient. After the server system transmits the web token to each of the recipients that are assigned data in the web token, the recipients may then receive the web token decrypt their portion of the web token without decrypting other portions of the web token. For example, a server system may send a web token that includes a list of recipients in an "aud" token claim, where the list of recipients includes the first recipient identifier "client_id_123" and the second recipient identifier "client_id_321." The client device represented by the first recipient identifier may receive the web token and determine that the first recipient identifier matches its stored value for itself without recognizing the second recipient identifier. The client device may further retrieve a key-value pair "client_id_123: ["public-key-123", <encrypted data>]" based on this first recipient identifier and, based on the key identifier "public-key-123," obtain a corresponding private key for the public key identified by the key identifier. The client device may then decrypt the encrypted data represented by "<encrypted data>" with this private key. In some embodiments, the client device may be unable to retrieve the encrypted data assigned to the second recipient identifier because it does not recognize the second recipient identifier or does not have access to a private key necessary for decrypting data assigned to the second recipient. By sending the same web token to different recipients.

As referred to herein, a nested web token portion may include a portion of a web token that is inside a nested set indicated by one or more types of delimiters. In some embodiments, the nested web token portion may comprise a key-value pair encompassed by a set of brackets that is within a larger portion of the web token (e.g., the "payload" portion of the web token), where the key-value pair may represent a token claim of the web token. In some embodiments, the use a key-value pair may permit the fast retrieval of recipient-related data by recipient identifier. In some embodiments, the use of key-value pairs can avoid the problem of recipient name collisions (e.g., attempts to store or retrieve first recipient data inadvertently cause the storage of retrieval of second recipient data). However, some embodiments may use other types of web token portions, such as a list of items, an array of numbers, etc.

As referred to herein, a key may include one or more types of values used to encrypt or decrypt data. In some embodiments, a key may be a key of an asymmetric encryption protocol, such as a public key or a private key of a public-private key pair. Alternatively, a key may be part of a symmetric encryption protocol, such as the Advanced Encryption Standard (AES) encryption protocol. Furthermore, in some embodiments, a key used in this disclosure may be used as part of a key derivation function (KDF) protocol.

It should be noted that the computing devices may be any type of computing device, including, but not limited to, a laptop computer, a tablet computer, a hand-held computer, and/or other computing equipment (e.g., a server), including "smart," wireless, wearable, and/or mobile devices. Furthermore, that embodiments described in this disclosure may include an individual user device that performs some or all the operations described in this disclosure. Alternatively, other embodiments may include multiple computing devices acting collectively to perform some or all the operations described in this disclosure.

In some embodiments, a communication subsystem 122 may obtain one or more requests from a client device 102 to perform a set of operations. For example, the client device 102 may send a request 182 to access account data to the server 120 that is stored in the set of databases 130. The communication subsystem 122 may receive the request 182 from the client device 102, where receiving the request 182 may cause the server 120 to perform operations to authenticate and execute operations based on information encoded in the request 182. Furthermore, as described elsewhere in this disclosure, after the server 120 generates a multi-recipient web token 184, the communication subsystem 122 may send the multi-recipient web token 184 to multiple devices including a first recipient 171 and a second recipient 172. Though FIG. 1 depicts the recipients of the multi-recipient web token 184 as being different from the client device 102 that prompted the creation of a web token, some embodiments may include, as a recipient of a multi-recipient web token, a client device that sent a request prompting the creation the multi-recipient web token.

In some embodiments, a web token generation subsystem 123 may generate web tokens designating multiple recipients, such as the multi-recipient web token 184. The web token generation subsystem 123 may first determine that fulfilling the operations requested in the request 182 would require performing an authentication operation with the use of the first recipient 171 and then executing a transaction with the second recipient 172. The web token generation subsystem 123 may retrieve identifiers for the first recipient 171 and the second recipient 172 from the set of databases 130. The web token generation subsystem 123 may then retrieve a pair of public keys and a corresponding pair of public key identifiers associated with the identifiers for the recipients 171-172. The web token generation subsystem 123 may then generate a web token having a first nested portion assigned to the first recipient 171 and a second nested portion assigned to the second recipient 172.

In some embodiments, an encryption subsystem 124 encrypts portions of data assigned to different recipients. For example, the encryption subsystem 124 may encrypt a first portion of the multi-recipient web token 184 assigned to the first recipient 171 using a public key associated with the first recipient 171. Furthermore, the encryption subsystem 124 may encrypt a second portion of the multi-recipient web token 184 assigned to the second recipient 172 using a public key associated with the second recipient 172. As described elsewhere, some embodiments may first encrypt the information assigned to different recipients and then construct a web token with the encrypted information. Alternatively, some embodiments may first construct the web token and then encrypt portions of the web token based on their associated key identifiers.

In some embodiments, after the server 120 generates the multi-recipient web token 184, the communication subsystem 122 can send versions of the multi-recipient web token 184 to the first recipient 171 and the second recipient 172. For example, the communication subsystem 122 may send a first version of the multi-recipient web token 184 to the first recipient 171. The first recipient 171 may then perform a first decryption using a first key to obtain the general information in the multi-recipient web token 184 and then perform a second decryption operation using a recipient-specific key to decrypt information assigned to the first recipient 171. Similarly, the second recipient 172 may receive a version of the multi-recipient web token 184 and decrypt a portion of the multi-recipient web token 184 assigned to the second recipient 172. The second recipient 172 may decrypt this information without decrypting or even be able to decrypt portion of the multi-recipient web token 184 assigned to the first recipient 171. By using different levels of encrypted information, some embodiments may use the same web token for different recipients, reducing the amount of overhead needed to keep track of token-based interactions and increasing the security of token-based operations.

In some embodiments, the communication subsystem 122 can concurrently send the multi-recipient web token 184 to the first recipient 171 and the second recipient 172. Alternatively, the communication subsystem 122 can send versions of the multi-recipient web token 184 to the first recipient 171 and the second recipient 172 in series. For example, some embodiments may first send a version of the multi-recipient web token 184 to the first recipient 171 and then wait for the first recipient 171 to provide a response that indicates that the request 182 is authenticated. After the first recipient 171 sends a response authenticating the request 182, the server 120 may use the communication subsystem 122 to send a second version of the multi-recipient web token 184 to the second recipient 172.

Figure 2:
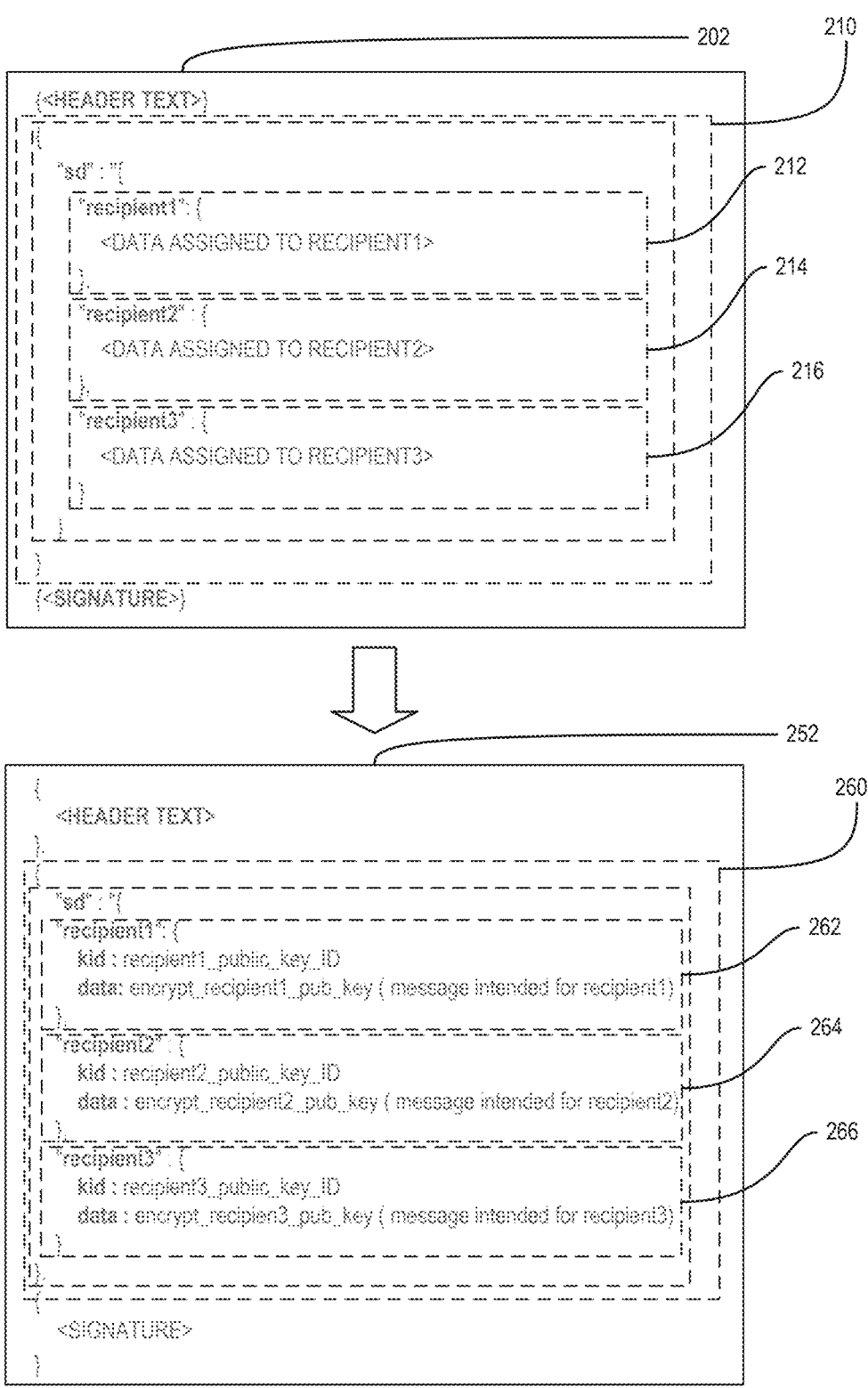
FIG. 2 shows an illustrative diagram of a web token with nested encryption protocol indicators, in accordance with one or more embodiments.

FIG. 2 shows an illustrative diagram of a web token with nested encryption protocol indicators, in accordance with one or more embodiments. Some embodiments may generate an intermediate web token 202 that includes a first portion 212 in a payload portion 210 of the intermediate web token 202. Based on a first recipient identifier "recipient1," a second recipient identifier "recipient2," and a third recipient identifier "recipient3," some embodiments may generate a first portion 212, a second portion 214, and a third portion 216. As shown in the payload portion 210, the recipient identifiers may be used as keys of a key-value pair. For example, the recipient identifier "recipient1" may be the key of the key-value pair within the first portion 212. Similarly, the recipient identifier "recipient2" may be the key of the key-value pair within the second portion 214. Additionally, the recipient identifier "recipient3" may be the key of the key-value pair within the third portion 216.

Some embodiments may then perform encryption operations based on the intermediate web token 202 to form a final web token 252. A computer system that is instructed to encrypt different portions of the payload portion 210 may first retrieve encryption keys related to these different portions. For example, some embodiments may retrieve a first encryption key that is identified by the first public key identifier "recipient1_pub_key_ID" from a key-storing database using the recipient identifier "recipient1." Similarly, some embodiments may retrieve a second encryption key that is identified by the second public key identifier "recipient2_public_key_ID" from the key-storing database using the recipient identifier "recipient2." Additionally, some embodiments may retrieve a third encryption key that is identified by the third public key identifier "recipient3_public_key_ID" using the recipient identifier "recipient3." Some embodiments may then use each of the retrieved encryption keys to encrypt the web token portions with their assigned recipients. For example, a computer system may use the public key identified by "recipient1_pub_key_ID" to encrypt information assigned to the recipient "recipient1" and form, within a payload portion 260, a first nested encrypted web token portion 262. Similarly, the computer system may use the public key identified by "recipient2_pub_key_ID" to encrypt information assigned to the recipient "recipient2" and form a second nested encrypted web token portion 264. Furthermore, the computer system may use the public key identified by "recipient3_pub_key_ID" to encrypt information assigned to the recipient "recipient3" who and form a third nested encrypted web token portion 266.

By separately encrypting each of these different portions, an intended recipient will be able to decrypt their portion of the final web token 252 while the other recipients should be unable to decrypt this portion of the final web token 252. For example, some embodiments may send a version of the final web token 252 to an API of the first recipient. After receiving the final web token 252, some embodiments may decrypt the data in the first nested encrypted web token portion 262 without being able to decrypt the data in the second nested encrypted web token portion 264 or the third nested encrypted web token portion 266.

Figure 3:
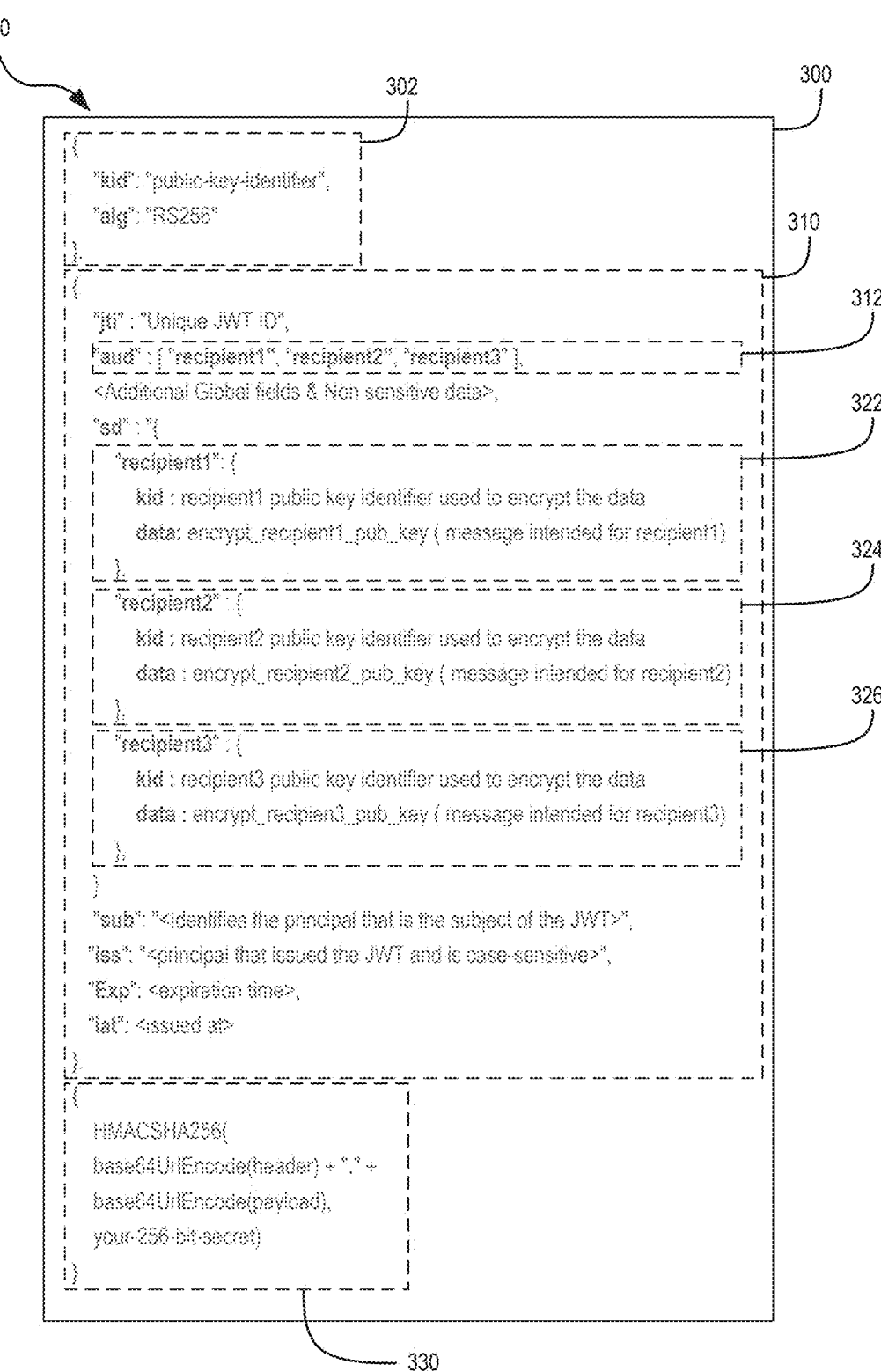
FIG. 3 shows illustrative components for a text representation of a web token with nested encryption protocol indicators, in accordance with one or more embodiments.

FIG. 3 shows illustrative components for a text representation of a web token with nested encryption protocol indicators, in accordance with one or more embodiments. A web token 300 includes a header portion 302, a payload portion 310, and a signature portion 330. The web token 300 is depicted as a JavaScript Object Notation (JSON) web token, where a JSON web token may be abbreviated as "JWT." However, it should be understood that other embodiments may generate other types of web tokens, such as Security Assertion Markup Language (SAML) tokens, OAuth Access Tokens, OpenID Connect (OIDC) tokens, etc. In some embodiments, the web tokens described in this disclosure may include key-value pairs having keys that are or include token claim names registered in the Internet Assigned Numbers Authority (IANA) registry, such as "aud," "sub," "iss," etc.

The header portion 302 may include a first public key identifier and an encryption type identifier to indicate an encryption type and be necessary key to decrypt the general information stored in the web token 300. The header portion 302 is followed by the payload portion 310, which may include both claim names that are registered in the IANA registry and application-specific claim names (e.g., "sd"). For example, the payload portion 310 may include a recipient list portion 312 that includes a key-value pair having "aud" as a key and a list of recipient identifiers as the value of that key-value pair. As shown in the recipient list portion 312, the list may include the recipient identifier "recipient1," the recipient identifier "recipient2," and the recipient identifier "recipient3." The payload portion 310 may include a key-value pair having the key "sd," which includes a first recipient-specific token portion 322, a second recipient-specific token portion 324, and a third recipient-specific token portion 326. The encryption keys used to encrypt the first recipient-specific token portion 322, the second recipient-specific token portion 324, and the third recipient-specific token portion 326 are different from each other and the key identified by "kid" in the header portion 302.

In some embodiments, the web token 300 may further include a signature block 350 at the end of the web token 300. The recipient device may use the signature block 352 determine the integrity of the web token 300, authenticate the server or other token-sending sending system used to transmit the web token 300, and verify individual portions of the payload portion 310. As shown in the signature block 350, a hash-based message authentication code (HMAC) may be used as part of the signature block 350. Some embodiments may combine, hash, and sign the header portion 302 and the payload portion 310 to form the signature block 350. It should be understood that such a signature-generating algorithm may differ between different web tokens and that multiple recipients may be provided with the means of verifying this signature.

Figure 4:
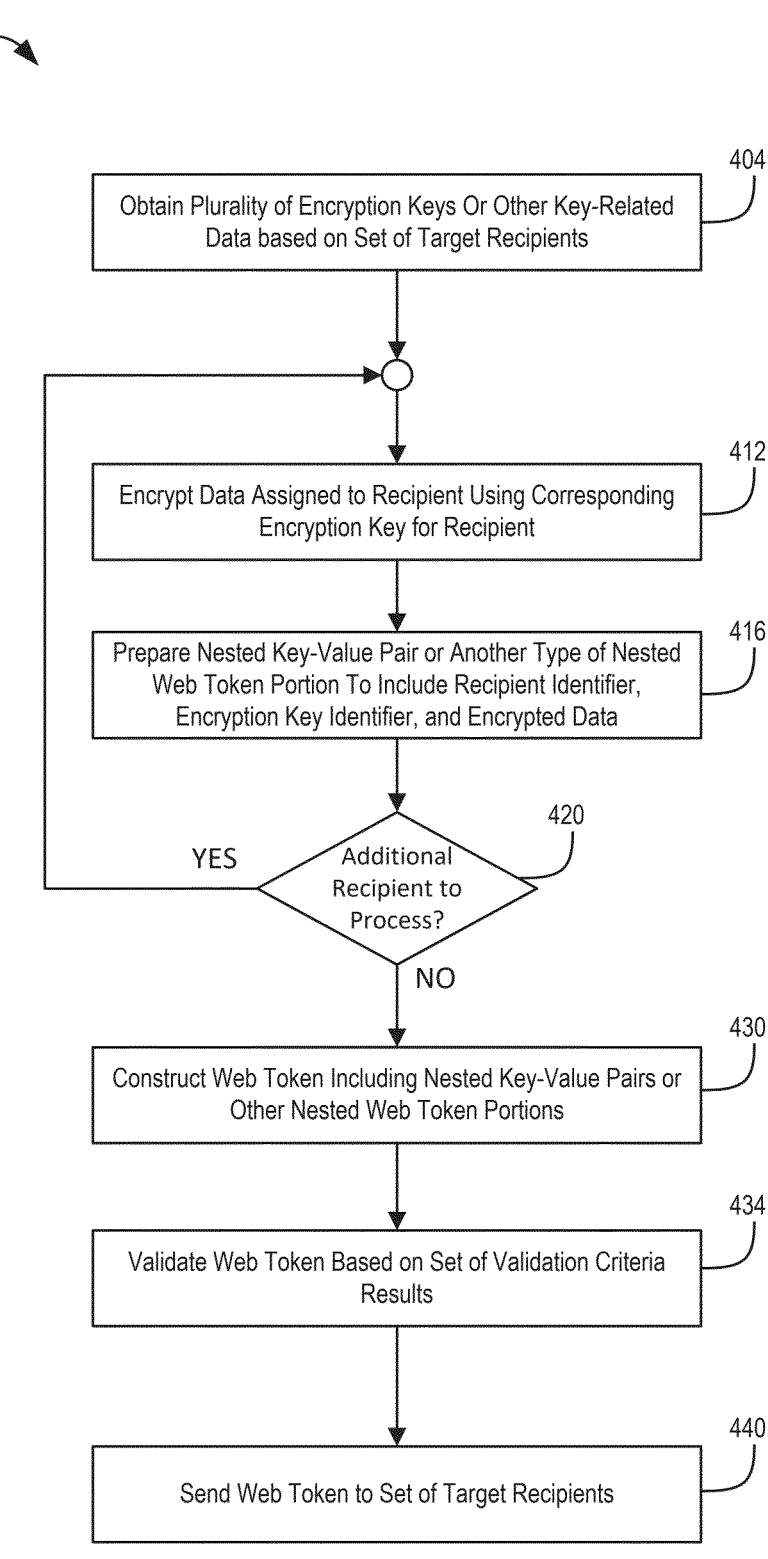
FIG. 4 shows a flowchart of a process for generating and using a web token with nested encryption protocol indicators, in accordance with one or more embodiments.

FIG. 4 shows a flowchart of a process 400 for generating and using a web token with nested encryption protocol indicators, in accordance with one or more embodiments. Some embodiments may obtain a plurality of encryption keys or other key-related data based on a set of target recipients, as indicated by block 404. Some embodiments may receive a web request other type of message that includes a set of instructions to communicate with multiple recipients or otherwise causes a computer system to communicate with the multiple recipients. For example, a computer system may obtain instructions to modify classified information that requires biometric validation and is available for viewing to only a pre-determined group of users. In the course of modifying this information, the computer system may send a token to a first recipient to convey the biometric information or other authentication information (e.g., a name, password, identification number, authentication pattern, etc.). The computer system may further send the token to a second recipient to effectuate instructions conveyed by the web request (e.g., access a database, effectuate a change in a value, effectuate a transaction between account records, etc.) after authentication. However, the encryption for this token must be selective such that each recipient may decrypt data assigned to the first recipient without being able to decrypt data assigned to other recipients. Some embodiments may obtain the key or key-related information (e.g., public keys, private keys, symmetric keys, key identifiers, algorithm indicators to indicate how to use a key, etc.) needed to encrypt recipient-specific information.

In some embodiments, a key management service may store key information, such as a recipient's public key or an identifier of the public key. For example, a key management service can store the public keys of more than ten different recipients, more than 100 different recipients, more than 1000 different recipients, etc. Each recipient may be associated with one or more public keys in the key management service. Operations of a key management service may include storing, in a key-storing database (e.g., a SQL database, a noSQL database, a graph database, etc.), an initial public key for a recipient, an initial association between the initial public key and the initial public key identifier, and a updating the key-storing database to replace the initial public key with a new public based on a determination that a hard expiration time or a soft expiration time is reached.

As described above, some embodiments may obtain a request from a client device to perform a set of operations that involves sending tokens to multiple recipients. Some embodiments may generate a query or otherwise instruct the key management service to retrieve the public keys associated with these multiple recipients and their corresponding key identifiers. For example, after receiving a request to execute a database transaction, some embodiments may retrieve a first recipient identifier for a recipient used to authenticate biometric data provided in the request and a second recipient identifier for a recipient used to execute the transaction. In some embodiments, this biometric data may first be encrypted by a client device sending the biometric data such that the biometric data is sent as encrypted biometric data. This biometric data may then be assigned to the first recipient, and instructions to effectuate transaction operations may be assigned to the second recipient. Some embodiments may then generate a web token based on the first data assigned to the first recipient and second data assigned to the second recipient by performing one or more operations described for the process 400.

Some embodiments may encrypt data assigned to a recipient using a corresponding encryption key for that recipient, as indicated by block 412. In some embodiments, a computer system (e.g., a server system), may encrypt data assigned to a recipient using an asymmetric key scheme. For example, some embodiments may retrieve a public key associated with a first recipient identifier for a first recipient and encrypt data assigned to the first recipient using the public key.

While some embodiments may encrypt each web token portion corresponding to different recipient using a same encryption algorithm, some embodiments change the encryption method used for different recipients. For example, a server application may encrypt first data assigned to a first recipient using a first asymmetric encryption method (e.g., a Rivest-Shamir-Adleman encryption method), second data assigned to a second recipient using a second asymmetric encryption method (e.g., an Elliptic Curve Cryptography method), and third data assigned to a third recipient using a symmetric encryption method. By using different encryption methods, some embodiments may further increase the security and trustworthiness of a multi-recipient web token.

Some embodiments may prepare a nested key-value pair or another type of nested web token portion to include a recipient identifier, and encryption key identifier, and the encrypted data, as indicated by block 416. As used in this disclosure, a web token portion may represent a portion of a web token that is divided based on brackets, delimiters, or other indications of separate sections of a web token, where a portion may include multiple other portions. For example, a JWT may be divided into a header portion, a payload portion, and a signature portion, where the payload portion may include multiple token claims each serving as a web token portion within the payload portion. For example, a payload portion may include a token claim '"sub": "1234567890".'

When constructing a web token that includes web token portions assigned to different recipients, some embodiments may use token claim that includes multiple key-value pairs. For example, some embodiments may construct a JWT that includes an "aud" token claim and a "sd" token claim, where the "aud" token claim may indicate recipient identifiers and the "sd" token claim may include key-value pairs. In some embodiments, the "sd" token claim may include key-value pairs such that, for each respective key-value pair, a respective recipient identifier is used as a key, and a respective value includes both a respective key identifier and encrypted data assigned to the respective recipient identified by the respective recipient identifier. Furthermore, while some embodiments may first encrypt data and then include the encrypted data in a web token, some embodiments may generate a web token with data assigned to a recipient without first encrypting the data and then modify the web token by encrypting the data assigned to the recipient after generating the web token. It should be understood that, while some embodiments may generate key-value pairs as nested web token portions, some embodiments may construct other types of web token portions, such as a general nested list of objects indexed by numeric values.

Some embodiments may determine whether there is an additional recipient to process, as indicated by block 420. For example, a server application may determine that, to effectuate an operation, three recipients must be contacted. The server application may determine that there is another recipient to process if no web token portion for that recipient was constructed using one or more operations described for block 412 or block 416. The server application may determine that there is no additional recipient to process if a respective web token portion was constructed for each respective recipient of all three recipients. Based on a determination that there are additional recipients to process, some embodiments may update the recipient to be processed to a new recipient of the target recipients and return to operations described for block 412. Otherwise, operations of the process 400 may proceed to operations described from block 430.

Some embodiments may construct a web token that includes the nested key-value pairs or other nested web token portions, as indicated by block 430. In some embodiments, a computer system can generate a web token that includes a header portion, a payload portion, and a signature portion. The header portion may indicate a hashing algorithm by including a hashing algorithm identifier of a hashing algorithm, such as HMAC with SHA-256 ("HS256"), RSA with SHA-256 ("RS256"), or ECDSA with SHA-256 ("ES256"). The header portion may also include a hashing algorithm key identifier (e.g., "publ-key-identifier") . As described elsewhere, the algorithm key identified in a header may differ from the algorithm keys associated with encrypted information in the nested web token portions assigned to different recipients. For example, a web token's header may include the key identifier "KID1," whereas a first nested key-value pair of that web token may include "KID2" to indicate that an encryption key identified by "KID2" was used to encrypt a portion of the nested key-value pair. In some embodiments, even the algorithm type identified in the header may be different from the algorithm type identified in the nested web token portions assigned to different recipient (e.g., the header includes the value "RS256," and the payload indicates a second hashing algorithm type with the value "HS256").

Some embodiments may update the web token based on a set of validation criteria results, as indicated by block 434. Some embodiments may first apply a set of validation criteria to a web token. In some embodiments, the set of validation criteria may include a uniqueness threshold. For example, a web token may determine a first uniqueness of a first web token claim and a second uniqueness of a second web token claim with respect to other web token claims in the web token. Some embodiments require that a uniqueness threshold be satisfied in order to permit the web token to be sent to one or more recipients. For example, a uniqueness threshold may require that the key or the value of a web token claim be unique with respect to other keys or values of other web token claims in the web token. In some embodiments, if a uniqueness threshold is not satisfied, some embodiments may prevent the transmission of a web token. Alternatively, or additionally, some embodiments may rename or re-encrypt (with a different encryption key or a different encryption algorithm) one or more values in web token claim.

In some embodiments a set of validation criteria may include a criterion that a refresh rate satisfies a threshold refresh rate. For example, a web token may include different refresh rates associated with expiration times for each respective token portion assigned to a respective recipient. Some embodiments may compare these different refresh rates to a threshold refresh rate to determine whether any refresh rate is too frequent or too infrequent. For example, some embodiments may generate a web token that includes "15 minutes" as a refresh rate for a first token claim in a JWT and "60 minutes" as a refresh rate for a second token claim in the JWT. Some embodiments may then determine that the "60 minutes" refresh rate is too long and modify both the data in the web token and the refresh rate assigned to the data for the second token claim to a lesser value (e.g., by configuring a refresh rate value assigned to the second token claim in a key management service).

In some embodiments a set of validation criteria may include a criterion that a refresh rate satisfies a threshold security level. In some embodiments, different recipients may be associated with different security levels based on a history of known data breaches. A security level may indicate a degree of trust assigned to a recipient with respect to that recipient's ability to secure transferred data (e.g., a security level may decrease or be re-categorized based on the number of breaches or recency of a breach). For example, some embodiments may determine that a first recipient is associated with a first history of known data breaches and that a second recipient is associated with a second history of known data breaches. Some embodiments may compare these security levels with a threshold security level, where the security levels may be represented as one or more numeric values associated with different categories, categories themselves (e.g., "risky," "vulnerable," and "safe"), or text descriptions. In response to a determination that a threshold security risk is not satisfied by a security level associated with a first recipient, some embodiments may modify an encryption algorithm used to encrypt data assigned to that first recipient. Alternatively, some embodiments may prevent further action with any web token related to that first recipient (e.g., use an alternative recipient in lieu of that first recipient).

Some embodiments may send the web token to the set of target recipients, as indicated by block 440. Some embodiments may concurrently send a token to multiple recipients, such that the sending of a web token to a second recipient is not conditioned on a response from a first recipient. Alternatively, some embodiments may sequentially send a web token, where the sequential sending of the web token may either be based on a schedule or may be conditioned on responses from earlier recipients. For example, some embodiments may send a JWT containing authentication data (e.g., biometric data) assigned to a first recipient and then obtain a response from the first recipient indicating that the authentication data satisfies a set of authentication criteria (e.g., a hashed password matches with a stored hash, biometric data matches with stored biometric data, etc.). After receiving the message indicating that the authentication data satisfies the set of authentication criteria, some embodiments may then send a version of the same JWT to a second recipient. This second recipient may be unable to decrypt the authentication data but be able to decrypt other data stored in the JWT, where the other data is assigned to the second recipient.

Figure 5:
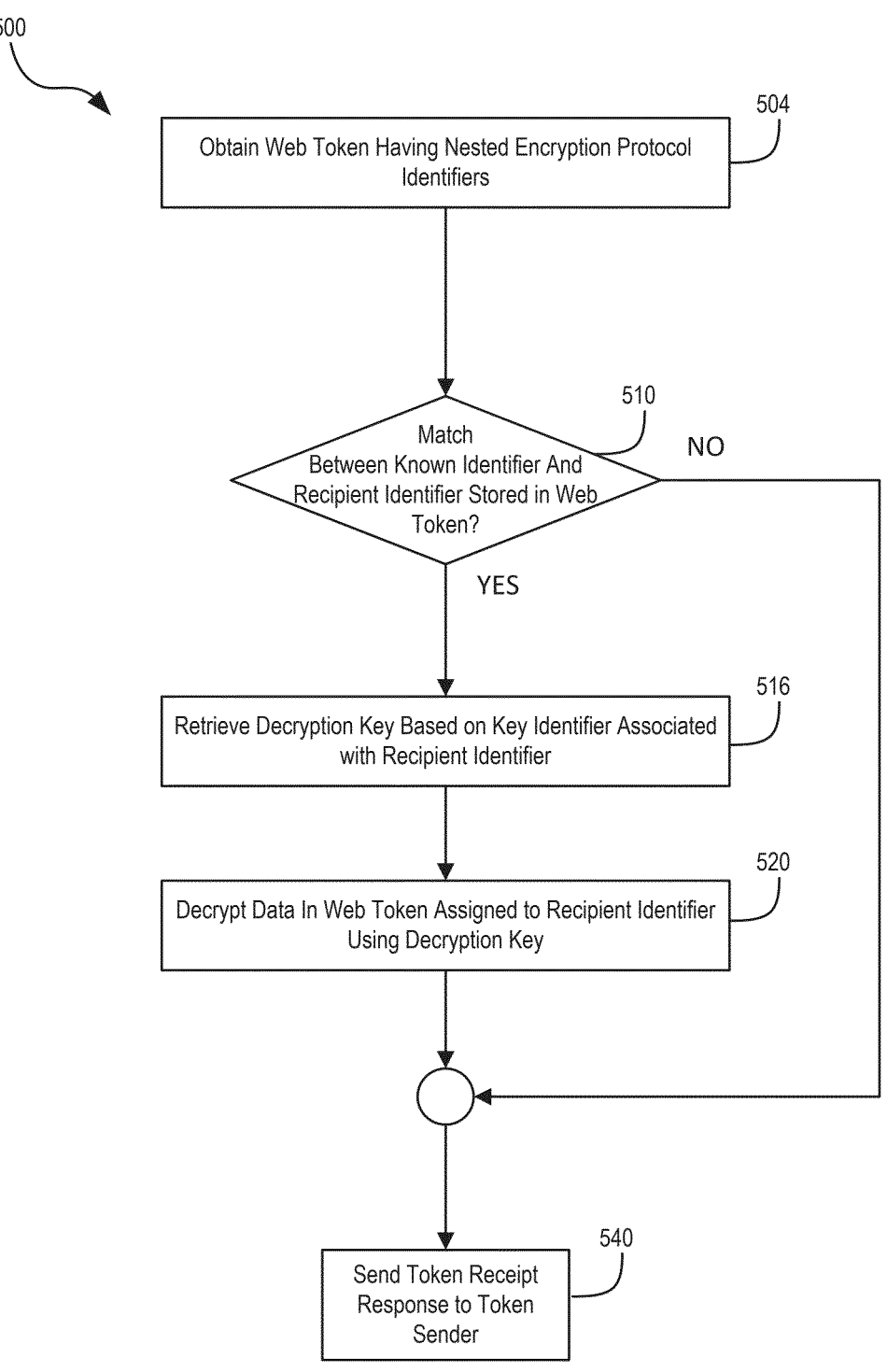
FIG. 5 shows a flowchart of a process for updating the encryption data in a web token with nested encryption protocol indicators, in accordance with one or more embodiments.

FIG. 5 shows a flowchart of a process 500 for updating the encryption data in a web token with nested encryption protocol indicators, in accordance with one or more embodiments. Some embodiments may obtain a web token having nested encryption protocol identifiers, as indicated by block 504. As described elsewhere, a web token may include multiple web token portions. For example, a JWT may include a first token claim that includes a first recipient identifier and a second token claim that includes a second recipient identifier. In some embodiments, a client device acting as a recipient device may retrieve a known identifier representing itself (e.g., an identifier of the client device, an identifier of a container, an identifier of an application hosted on the client device, etc.) and compare this identifier with the list of recipient identifiers in the JWT.

Some embodiments may determine whether a match between a known identifier and a recipient identifier stored in the web token is detected, as indicated by block 510. In some embodiments, the match between the known identifier and the recipient identifier may be direct match. For example, an application on a recipient device may label itself as "recipient_1" and detect that a received token claim includes a key-value pair that has "recipient_1" as a key. Alternatively, the application may convert one or both identifiers (e.g., via hashing) to another name to determine whether a match occurs, where such operations may serve to further obfuscate and increase data security. For example, a recipient device may receive a web token and convert each key in a set of key-value pairs of the web token to a modified recipient identifier (e.g., via a hashing function) and then detect whether there are any matches between the modified recipient identifier and a known identifier. In response to a determination that a match between the known identifier and the recipient identifier stored in the web token is detected, operations of the process 500 may proceed to operations described for block 516. Otherwise, operations of the process 500 may proceed to operations described for block 540.

Some embodiments may retrieve a decryption key based on a key identifier associated with the recipient identifier, as indicated by block 516. Some embodiments may retrieve a private key from a client-side memory. Some embodiments may store multiple private keys and use additional information in the web token to retrieve a relevant private key to decrypt information in an obtained web token. As described elsewhere, a recipient may use one or more decryption algorithms to decrypt encrypted data in a web token and may use different decryption keys or even different decryption algorithms for different received web tokens.

Some embodiments may decrypt data in the web token assigned to the recipient identifier using the decryption key, as indicated by block 520. As describe elsewhere, a web token generated using operations described in this disclosure may include different data portions assigned to multiple recipients. In some embodiments, a recipient may use a retrieved decryption key to decrypt a data portion assigned to that recipient. For example, after obtaining a web token, a client device acting as a recipient device may detect a match between a key of a token claim in web token and a known identifier, where a first sub-portion of the value corresponding with the key includes a key identifier and a second sub-portion of the value includes encrypted data. The client device may retrieve a private key associated with the key identifier and decrypt the second sub-portion using the retrieved private key.

Some embodiments may send a token receipt response to the token sender, as indicated by block 540. Some embodiments may provide a confirmation to a sender of a web token indicating that at least a portion of the web token was decrypted. For example, after obtaining a web token from a server system, a client device may decrypt a first portion of the web token and indicate that the web token was successfully decrypted. Some embodiments may indicate which portion of the web token was decrypted to confirm that the correct portion was decrypted. In some embodiments, confirmation of a successful decryption may be paired with an incorrect identifier of the decrypted portion, which may be used to indicate that one or more upstream data processing or data validation processes is incorrect.

Figure 6:
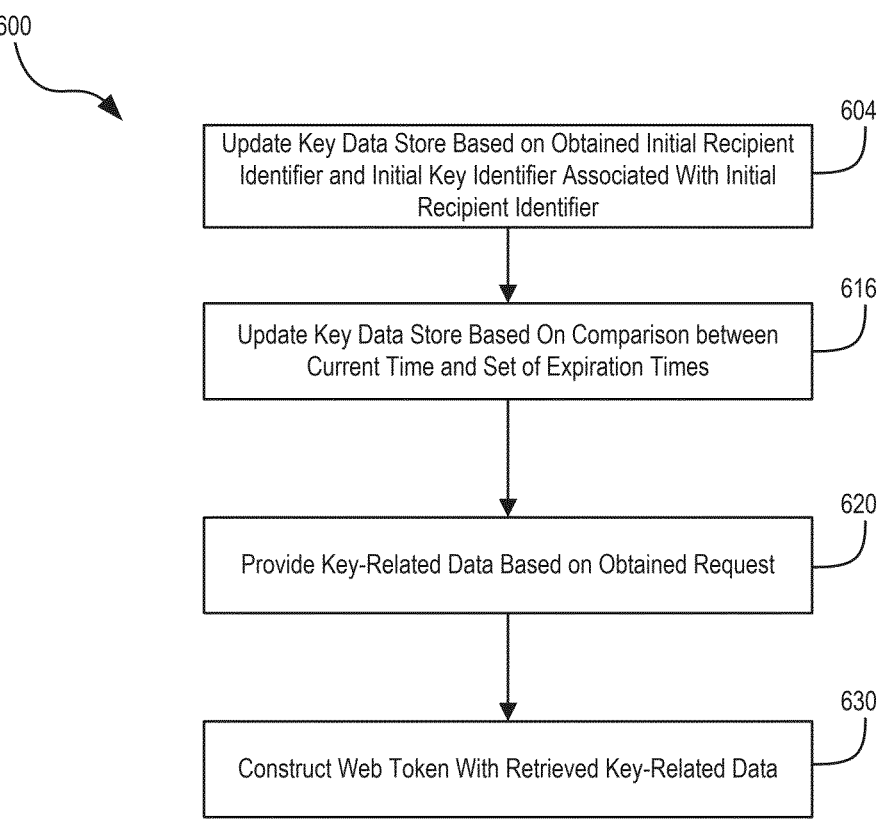
FIG. 6 shows a flowchart of a process for managing keys used to generate a web token having nested encryption protocol indicators, in accordance with one or more embodiments.

FIG. 6 shows a flowchart of a process 600 for managing keys used to generate a web token having nested encryption protocol indicators, in accordance with one or more embodiments. Some embodiments may update a key data store based on an obtained initial recipient identifier and initial key identifier associated with an initial recipient identifier, as indicated by block 604. Some embodiments create a record forming an initial association between a first recipient identifier and an initial key identifier (e.g., an initial public key identifier that identifies a public key). The record may further include or otherwise associate the first recipient identifier with the initial key being identified by initial key identifier. For example, some embodiments may receive a first public key and first public key identifier from a first recipient and, in response, generate a record associating the first public key and first public key identifier with the first recipient.

As described elsewhere in this disclosure, unlike conventional systems, the construction of a web token having nested encryption protocol indicators for multiple recipients may require a combination of private and public keys such that the information for one or more recipients does not include a private key. For example, some embodiments may obtain an initial handshake message from a recipient that includes a public key and corresponding public key identifier. In response, some embodiments may use a key management service to update a key data store to add a record that includes the recipient identifier, an initial public key, and an initial public key identifier for the initial public key. Such a record does not need to include or otherwise be associated with a private key in the same key data store because the recipient may be the entity that possesses the private key and decrypts token data with the private key.

Some embodiments may update a key data store based on a comparison between a current time and a set of expiration times, as indicated by block 616. In some embodiments, operations of the process 600 may use a key management service, where the key management service may store and manage keys, generate keys, rotate keys based on a refresh rate, rotate keys based on recipient-provided keys or recipient-provided expiration times, etc. For example, some embodiments may determine that a current time has exceeded a soft expiration time and select a new set of keys for a recipient identifier corresponding with a time period after the soft expiration time. When generating a new web token, some embodiments may then use, for the new be token, both (1) a previous public key and a previous public key identifier used in a previous web token claim of a previous web token as well as (2) a new public key and new public key identifier for the new web token claim.

Some embodiments may provide key-related data based on an obtained request, as indicated by block 620. For example, some embodiments may receive a request from a client device to effectuate operations that would require the sending of data to multiple recipients and, in response, retrieve key-related data based on the recipient identifiers of these multiple recipients. In some embodiments, a key management service may receive an identifier of a recipient from a server application or other application to effectuate one or more operations requiring communication with the recipient. In response, the key management service may provide a public key, a public key identifier of that public key, a hard expiration time, or a soft expiration time associated with that recipient identifier from a key data store. In some embodiments, a key management service may be operating independently as a separate application on a separate machine with respect an application requesting the data. Alternatively, some embodiments may use a key management service that is partially or fully integrated with a broader application that is requesting key-related data.

The expiration time may be provided in coordinated universal time (UTC) format or in a different format. By providing these values, some embodiments may provide information necessary to generate a multi-recipient web token that accounts for different expiration times of different recipients. Furthermore, the key management service may be configured to provide recipient-specific information without revealing the information of other recipients. For example, a key management service may receive a request to obtain information about a first recipient identified in a web token and provide the public key and public key identifier to the first recipient without providing information about a second recipient identified in the web token.

Some embodiments may construct a web token based on retrieved key-related data, as indicated by block 630. When constructing a web token, some embodiments may perform operations similar to or the same as those described for block 430. Because key-related recipient information may be independently updated with respect to the key-related information of other recipients, some embodiments may generate different web tokens such that both a previous web token and a later-generated web token shares the same key identifier and the same encrypted data for a first recipient but have a different key identifier and different encrypted data for the second recipient.

As described elsewhere, when constructing a web token, the current time as related to one or more expiration times may determine the encryption of one or more portions of the web token. For example, some embodiments may generate a first web token that has a first encrypted portion encrypted with a first public key and a second encrypted portion encrypted with a second public key. Some embodiments may later determine a result indicating that a soft expiration time for the first public key is exceeded and that no expiration times for the second public key is exceeded. Based on this result, a computer system may retrieve a new public key, the first public key, and the second public key. The computer system may then generate a second web token to include a new web token portion having a new encrypted portion while still keeping the first encrypted portion and the second encrypted portion, where the new encrypted portion is encrypted with the new public key.

Alternatively, or additionally, in some embodiments, a computer system may later determine a result indicating that a hard expiration time for the first public key is exceeded and that no expiration times for the second public key is exceeded. Based on this result, the computer system may retrieve a new public key in lieu of the first public key. The computer system may then generate a third web token to include a new web token portion having a new encrypted portion in lieu of the first encrypted portion while keeping the second encrypted portion, where the new encrypted portion is encrypted with the new public key.

Furthermore, some embodiments may accommodate different scheduling regimes. For example, a first recipient may accommodate the use of both a soft expiration time and a hard expiration time, while a second recipient may only use a hard expiration time. In response, some embodiments may construct a web token such that both soft and hard expiration times for a key of the first recipient is stored in the web token, and such that a hard expiration time for a key of the second recipient is stored in the web token without any soft expiration times for the key of the second recipient.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on one or more non-transitory, machine-readable media (e.g., a set of machine-readable storage media), such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record. Additionally, as used in the specification, "a portion" refers to a part of, or the entirety of (i.e., the entire portion), a given item (e.g., data) unless the context clearly dictates otherwise.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

Enumerated Embodiments

The present techniques will be better understood with reference to the following enumerated embodiments:

1. A method comprising: obtaining a set of keys comprising a first key and a second key and an associated set of key identifiers comprising a first key identifier and a second key identifier; generating a web token by: generating a first web token portion comprising the first identifier, the first key identifier, and first encrypted information; generating a second web token portion comprising the second identifier, the second key identifier, second encrypted information, wherein the first encrypted information is encrypted based on the first key and first information, and wherein the second encrypted information is encrypted based on the second key and second information; and issuing the web token to the first recipient or the second recipient.

2. A method comprising: obtaining a first public key and a first key identifier associated with the first public key based on a first recipient identifier for a first recipient; obtaining a second public key and a second key identifier associated with the second public key based on a second recipient identifier for a second recipient; generating a web token by: generating a first key-value pair based on the first recipient identifier, wherein a value of the first key-value pair comprises the first key identifier and first encrypted information, and wherein the first encrypted information is encrypted based on the first public key and first information; generating a second key-value pair based on the second recipient identifier, wherein a value of the second key-value pair comprises the second key identifier and second encrypted information, and wherein the second encrypted information is encrypted based on the second public key and second information; and issuing the web token to the first recipient or the second recipient.

3. A method comprising: obtaining, over a first computer network, a first public key and a first public key identifier associated with the first public key in response to obtaining a first recipient identifier for a first recipient; obtaining, over the first computer network, a second public key and a second public key identifier associated with the second public key in response to obtaining a second recipient identifier for a second recipient; generating, at a first network location of the first computer network, a JavaScript Object Notation (JSON) web token based on the first recipient identifier and the second recipient identifier by: generating a first key-value pair in a payload by using the first recipient identifier as a key of the first key-value pair, wherein a value of the first key-value pair comprises both the first public key identifier and first encrypted information, and wherein the first encrypted information is encrypted by using the first public key to encrypt first claim information assigned to the first recipient; generating a second key-value pair in the payload by using the second recipient identifier as a key of the second key-value pair, wherein a value of the second key-value pair comprises both the second public key identifier and second encrypted information, and wherein the second encrypted information is encrypted by using the second public key to encrypt second claim information assigned to the second recipient; and transmitting, by the first network location of the first computer network, the JSON web token to the first recipient and the second recipient, wherein the first recipient has access to a first private key associated with the first public key identifier, and wherein the second recipient has access to a second private key associated with the second public key identifier.

4. A method comprising: obtaining, over a first computer network, a first public key and a first key identifier associated with the first public key based on a first recipient identifier for a first recipient; obtaining, over a first computer network, a second public key and a second key identifier associated with the second public key based on a second recipient identifier for a second recipient; generating, at a first network location of the first computer network, a web token by: generating a first key-value pair based on the first recipient identifier, wherein a value of the first key-value pair comprises the first key identifier and first encrypted information, and wherein the first encrypted information is encrypted based on the first public key and first information assigned to the first recipient; generating a second key-value pair based on the second recipient identifier, wherein a value of the second key-value pair comprises the second key identifier and second encrypted information, wherein the second encrypted information is encrypted based on the second public key and second information assigned to the second recipient; and transmitting, by the first network location of the first computer network, the web token to the first recipient and the second recipient.

5. The method of any one of the preceding embodiments, further comprising: updating a database to indicate an initial association between the first recipient identifier and an initial public key identifier associated with an initial public key; generating a previous web token based on the initial association, the previous web token comprising: a first previous token claim comprising the second recipient identifier and the second key identifier; and a second previous token claim comprising the first recipient identifier and an initial key identifier; sending, to the first recipient and the second recipient, the previous web token; determining a result indicating that a current time satisfies a first expiration time associated with the initial public key and that the current time does not satisfy a second expiration time associated with the second public key; and updating the database to indicate a first association between the first recipient identifier and the first key identifier based on the result indicating that the current time satisfies the first expiration time, wherein generating the web token comprises retrieving, from the database, the first public key in lieu of the initial public key based the first association.

6. The method of any one of the preceding embodiments, further comprising: obtaining a request comprising the first recipient identifier from a requester; and sending, to the requester, a message comprising the first public key and not comprising the second public key.

7. The method of any one of the preceding embodiments, wherein: the first expiration time is a hard expiration time: the database indicates a soft expiration time associated with the initial public key, the hard expiration time being later than the soft expiration time; determining a second result indicating that a time for sending a message is before the hard expiration time and after the soft expiration time; and the method further comprises generating the message, wherein the message comprises both the first public key and the initial public key based on the second result.

8. The method of any one of the preceding embodiments, wherein the first expiration time is a hard expiration time, and wherein the web token comprises a payload comprising: a soft expiration time in a first token claim; and the hard expiration time in a second token claim.

9. The method of any one of the preceding embodiments, wherein the web token comprises a header portion, the header portion comprising a hashing algorithm identifier and a third key identifier used to encrypt the web token, wherein the third key identifier is different from both the first key identifier and the second key identifier.

10. The method of any one of the preceding embodiments, wherein: the web token comprises a third key-value pair; a key of the third key-value pair comprises a token claim name registered in the Internet Assigned Numbers Authority (IANA) registry; and a value of the third key-value pair comprises a recipient list comprising the first recipient identifier and the second recipient identifier.

11. The method of any one of the preceding embodiments, wherein the first encrypted information comprises encrypted biometric data, and wherein the second encrypted information does not comprise biometric data, and wherein issuing the web token comprises issuing a first version of the web token to the first recipient, further comprising: obtaining a response from the first recipient indicating that the biometric data satisfies a set of authentication criteria; and based on the response, issuing a second version of the web token to the second recipient.

12. The method of any one of the preceding embodiments, wherein: issuing the web token to the first recipient causes the first recipient to decrypt the first encrypted information without decrypting the second encrypted information; and issuing the web token to the second recipient causes the second recipient to decrypt the second encrypted information without decrypting the first encrypted information.

13. The method of any one of the preceding embodiments, wherein issuing the web token to the first recipient comprises sending the web token to a client device, the client device to perform operations comprising: obtaining the web token; detecting a match between the first recipient identifier and a known identifier stored in a memory of the client device; retrieve a private key based on the match; and decrypting the first encrypted information based on the private key.

14. The method of any one of the preceding embodiments, wherein generating the web token further comprises: determining a first expiration time associated with the first public key; determining a second expiration time associated with the second public key; and comparing the first expiration time and the second expiration time to a threshold expiration time.

15. The method of any one of the preceding embodiments, wherein generating the web token further comprises: determining a first security level associated with the first public key; determining a second security level associated with the second public key; and comparing the first security level and the second security level to a threshold security level.

16. The method of any one of the preceding embodiments, wherein generating the web token further comprises: determining a first uniqueness associated with the first public key; determining a second uniqueness associated with the second public key; and comparing the first uniqueness and the second uniqueness to a threshold uniqueness.

17. The method of any one of the preceding embodiments, wherein generating the web token further comprises: determining a first refresh rate associated with the first public key; determining a second refresh rate associated with the second public key; and comparing the first refresh rate and the second refresh rate to a threshold refresh rate.

18. The method of any one of the preceding embodiments, wherein generating the web token further comprises: determining a first security risk associated with the first public key based on known data breaches; determining a second security risk associated with the second public key based on the known data breaches; and comparing the first security risk and the second security risk to a threshold security risk.

19. The method of any one of the preceding embodiments, further comprising: updating a database to indicate an initial association between the first recipient identifier and an initial public key; determining a first result indicating that a current time satisfies an expiration time associated with the initial public key; updating the database to indicate a first association between the first recipient identifier and the first public key based on the first result, wherein generating the web token comprises retrieving the first public key based on the first association indicated in the database.

20. The method of any one of the preceding embodiments, wherein the expiration time is a first expiration time, further comprising: determining a second result indicating that a second expiration time associated with the second public key is satisfied; and generating a second web token based on the second result, the second web token comprising: the first recipient identifier; the first key identifier, wherein the first key identifier is associated with the first recipient identifier in a first new token claim of the second web token; the second recipient identifier; a third key identifier for a third public key, wherein the third key identifier is associated with the second recipient identifier in a second new token claim of the second web token; and sending the second web token to the first recipient and the second recipient.

21. The method of any one of the preceding embodiments, further comprising: obtaining a request from a requester; and sending a message to the requester, the message comprising the first public key and the initial public key.

22. A tangible, non-transitory, machine-readable medium storing instructions that, when executed by a data processing apparatus, cause the data processing apparatus to perform operations comprising those of any of embodiments 1-21.

23. A system comprising one or more processors; and memory storing instructions that, when executed by the processors, cause the processors to effectuate operations comprising those of any of embodiments 1-21.

24. A system comprising means for performing any of embodiments 1-21.

What is claimed is:

1. A system for enhancing communication security across computer networks with web tokens using nested encryption protocol indicators, the system comprising:

one or more processors; and one or more machine-readable storage media storing program instructions that, when executed by the one or more processors, perform operations comprising:

obtaining, over a first computer network, a first public key and a first public key identifier associated with the first public key in response to obtaining a first recipient identifier for a first recipient;

obtaining, over the first computer network, a second public key and a second public key identifier associated with the second public key in response to obtaining a second recipient identifier for a second recipient;

generating, at a first network location of the first computer network, a JavaScript Object Notation (JSON) web token based on the first recipient identifier and the second recipient identifier by:

24 generating a first key-value pair in a payload by using the first recipient identifier as a key of the first key-value pair, wherein a value of the first key-value pair comprises both the first public key identifier and first encrypted information, and wherein the first encrypted information is encrypted by using the first public key to encrypt first claim information assigned to the first recipient;

generating a second key-value pair in the payload by using the second recipient identifier as a key of the second key-value pair, wherein a value of the second key-value pair comprises both the second public key identifier and second encrypted information, and wherein the second encrypted information is encrypted by using the second public key to encrypt second claim information assigned to the second recipient; and transmitting, by the first network location of the first computer network, the JSON web token to the first recipient and the second recipient, wherein the first recipient has access to a first private key associated with the first public key identifier, and wherein the second recipient has access to a second private key associated with the second public key identifier.

2. A method for enhancing communication security across computer networks with web tokens using nested encryption protocol indicators, the method comprising:

obtaining, over a first computer network, a first public key and a first key identifier associated with the first public key based on a first recipient identifier for a first recipient;

obtaining, over the first computer network, a second public key and a second key identifier associated with the second public key based on a second recipient identifier for a second recipient;

generating, at a first network location of the first computer network, a web token by:

generating a first key-value pair based on the first recipient identifier, wherein a value of the first key-value pair comprises the first key identifier and first encrypted information, and wherein the first encrypted information is encrypted based on the first public key and first information assigned to the first recipient;

generating a second key-value pair based on the second recipient identifier, wherein a value of the second key-value pair comprises the second key identifier and second encrypted information, wherein the second encrypted information is encrypted based on the second public key and second information assigned to the second recipient; and transmitting, by the first network location of the first computer network, the web token to the first recipient and the second recipient.

3. The method of claim 2, further comprising:

updating a database to indicate an initial association between the first recipient identifier and an initial public key identifier associated with an initial public key;

generating a previous web token based on the initial association, the previous web token comprising:

a first previous token claim comprising the second recipient identifier and the second key identifier; and a second previous token claim comprising the first recipient identifier and an initial key identifier;

25 sending, to the first recipient and the second recipient, the previous web token;

determining a result indicating that a current time satisfies a first expiration time associated with the initial public key and that the current time does not satisfy a second expiration time associated with the second public key; and updating the database to indicate a first association between the first recipient identifier and the first key identifier based on the result indicating that the current time satisfies the first expiration time, wherein generating the web token comprises retrieving, from the database, the first public key in lieu of the initial public key based the first association.

4. The method of claim 3, further comprising:

obtaining a request comprising the first recipient identifier from a requester; and sending, to the requester, a message comprising the first public key and not comprising the second public key.

5. The method of claim 3, wherein:

the first expiration time is a hard expiration time:

the database indicates a soft expiration time associated with the initial public key, the hard expiration time being later than the soft expiration time;

determining a second result indicating that a time for sending a message is before the hard expiration time and after the soft expiration time; and the method further comprises generating the message, wherein the message comprises both the first public key and the initial public key based on the second result.

6. The method of claim 3, wherein the first expiration time is a hard expiration time, and wherein the web token comprises a payload comprising:

a soft expiration time in a first token claim; and the hard expiration time in a second token claim.

7. The method of claim 2, wherein the web token comprises a header portion, the header portion comprising a hashing algorithm identifier and a third key identifier used to encrypt the web token, wherein the third key identifier is different from both the first key identifier and the second key identifier.

8. The method of claim 2, wherein:

the web token comprises a third key-value pair;

a key of the third key-value pair comprises a token claim name registered in the Internet Assigned Numbers Authority (IANA) registry; and a value of the third key-value pair comprises a recipient list comprising the first recipient identifier and the second recipient identifier.

9. The method of claim 2, wherein the first encrypted information comprises encrypted biometric data, and wherein the second encrypted information does not comprise biometric data, and wherein issuing the web token comprises issuing a first version of the web token to the first recipient, further comprising:

obtaining a response from the first recipient indicating that the biometric data satisfies a set of authentication criteria; and based on the response, issuing a second version of the web token to the second recipient.

10. The method of claim 2, wherein:

issuing the web token to the first recipient causes the first recipient to decrypt the first encrypted information without decrypting the second encrypted information; and

26 issuing the web token to the second recipient causes the second recipient to decrypt the second encrypted information without decrypting the first encrypted information.

11. The method of claim 2, wherein issuing the web token to the first recipient comprises sending the web token to a client device, the client device to perform operations comprising:

obtaining the web token;

detecting a match between the first recipient identifier and a known identifier stored in a memory of the client device;

retrieve a private key based on the match; and decrypting the first encrypted information based on the private key.

12. The method of claim 2, wherein generating the web token further comprises:

determining a first expiration time associated with the first public key;

determining a second expiration time associated with the second public key; and comparing the first expiration time and the second expiration time to a threshold expiration time.

13. The method of claim 2, wherein generating the web token further comprises:

determining a first security level associated with the first public key;

determining a second security level associated with the second public key; and comparing the first security level and the second security level to a threshold security level.

14. The method of claim 2, wherein generating the web token further comprises:

determining a first uniqueness associated with the first public key;

determining a second uniqueness associated with the second public key; and comparing the first uniqueness and the second uniqueness to a threshold uniqueness.

15. The method of claim 2, wherein generating the web token further comprises:

determining a first refresh rate associated with the first public key;

determining a second refresh rate associated with the second public key; and comparing the first refresh rate and the second refresh rate to a threshold refresh rate.

16. The method of claim 2, wherein generating the web token further comprises:

determining a first security risk associated with the first public key based on known data breaches;

determining a second security risk associated with the second public key based on the known data breaches; and comparing the first security risk and the second security risk to a threshold security risk.

17. One or more non-transitory, machine-readable media storing program instructions that, when executed by one or more processors, causes the one or more processors to perform operations comprising:

obtaining a first public key and a first key identifier associated with the first public key based on a first recipient identifier for a first recipient;

obtaining a second public key and a second key identifier associated with the second public key based on a second recipient identifier for a second recipient;

generating a web token by:

generating a first key-value pair based on the first recipient identifier, wherein a value of the first key-value pair comprises the first key identifier and first encrypted information, and wherein the first encrypted information is encrypted based on the first public key and first information;

generating a second key-value pair based on the second recipient identifier, wherein a value of the second key-value pair comprises the second key identifier and second encrypted information, and wherein the second encrypted information is encrypted based on the second public key and second information; and issuing the web token to the first recipient or the second recipient.

18. The one or more machine-readable media of claim 17, further comprising:

updating a database to indicate an initial association between the first recipient identifier and an initial public key;

determining a first result indicating that a current time satisfies an expiration time associated with the initial public key;

updating the database to indicate a first association between the first recipient identifier and the first public key based on the first result, wherein generating the web token comprises retrieving the first public key based on the first association indicated in the database.

19. The one or more machine-readable media of claim 18, wherein the expiration time is a first expiration time, further comprising:

determining a second result indicating that a second expiration time associated with the second public key is satisfied; and generating a second web token based on the second result, the second web token comprising:

the first recipient identifier;

the first key identifier, wherein the first key identifier is associated with the first recipient identifier in a first new token claim of the second web token;

the second recipient identifier;

a third key identifier for a third public key, wherein the third key identifier is associated with the second recipient identifier in a second new token claim of the second web token; and sending the second web token to the first recipient and the second recipient.

20. The one or more machine-readable media of claim 18, further comprising:

obtaining a request from a requester, and sending a message to the requester, the message comprising the first public key and the initial public key.

*   *   *   *   *